Nov. 7, 1944. H. ALLEN 2,361,915
WEIGHT INDICATOR
Filed Dec. 23, 1940 4 Sheets-Sheet 1

HERBERT ALLEN
INVENTOR.

BY Lester B. Clark
ATTORNEY

Nov. 7, 1944.   H. ALLEN   2,361,915
WEIGHT INDICATOR
Filed Dec. 23, 1940   4 Sheets-Sheet 3

HERBERT ALLEN
INVENTOR.
BY Lester B. Clark
ATTORNEY

Nov. 7, 1944.    H. ALLEN    2,361,915
WEIGHT INDICATOR
Filed Dec. 23, 1940    4 Sheets-Sheet 4
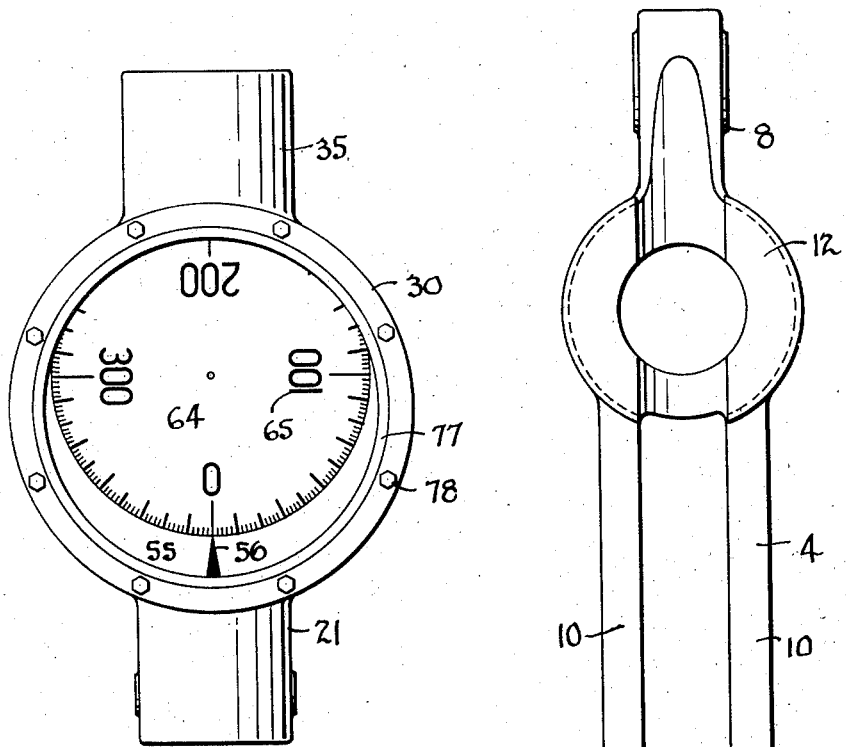
Fig. 4.
Fig. 5.
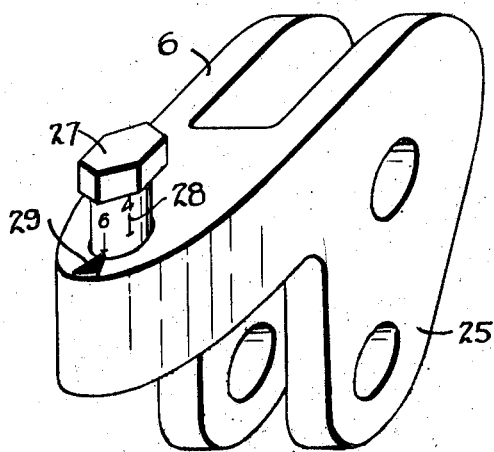
Fig. 6.
HERBERT ALLEN
*INVENTOR.*
BY Lester B. Clark
*ATTORNEY*

Patented Nov. 7, 1944

2,361,915

UNITED STATES PATENT OFFICE 2,361,915

WEIGHT INDICATOR

Herbert Allen, Houston, Tex., assignor, by mesne assignments, to Cameron Iron Works, Inc.

Application December 23, 1940, Serial No. 371,254

9 Claims. (Cl. 73—144)

The invention relates to a weight indicator of the type applied to hoisting lines or drilling rigs wherein it is desired to obtain an indication of the weight which is being carried by the hoisting line.

It is one of the objects of the invention to provide a simple and economical indicator device which will not be subject to vibrations and wherein a constant indication can be obtained.

Another object of the invention is to provide an elastic system in a weight indicator for the purpose of determining the weight being carried.

Another object of the invention is to provide a linkage mechanism which will operate an elastic system in a weight indicator.

Still another object of the invention is to provide an elastic system including a spring or beam to be flexed by the load of the weight being carried.

Still another object of the invention is to provide a weight indicator wherein an adjustable load lever is provided.

Other and further objects of the invention will be readily apparent when the following description is considered in connection with the accompanying drawings, wherein:

Fig. 4 is a front elevation on a reduced scale with the indicator dial in position.

Fig. 5 is an elevation of the load arm.

Fig. 6 is a perspective view of the load lever.

The invention relates generally, insofar as the elastic system is concerned, to the broad disclosure in my copending application Serial No. 212,244, filed June 7, 1938, for a Pressure gauge.

In weight indicators of the type herein disclosed a cable or hoisting line is usually anchored at one end known as the dead line. The cable then passes over the sheaves and may be threaded or strung in several lines over the sheaves. The hoisting line may be strung as either 2, 4, 6 or 8 lines, as the case may be, depending upon the size of the source of power, the load to be handled, etc. Weight indicators to be used on the dead line, therefore, must be adjustable so as to compensate for the number of lines which have been strung so as to indicate accurately the load being carried by the hoisting line. With this in mind, the present device has been arranged so that it is adjustable to accommodate the number of lines to be used and will accurately indicate the load or weight thereon.

The device operates upon the principle of misaligning the hoisting line or cable so that the load on the line tends to straighten out the cable, and this tendency to straighten out is used for the purpose of transmitting the load to the indicator device.

Figure 2:
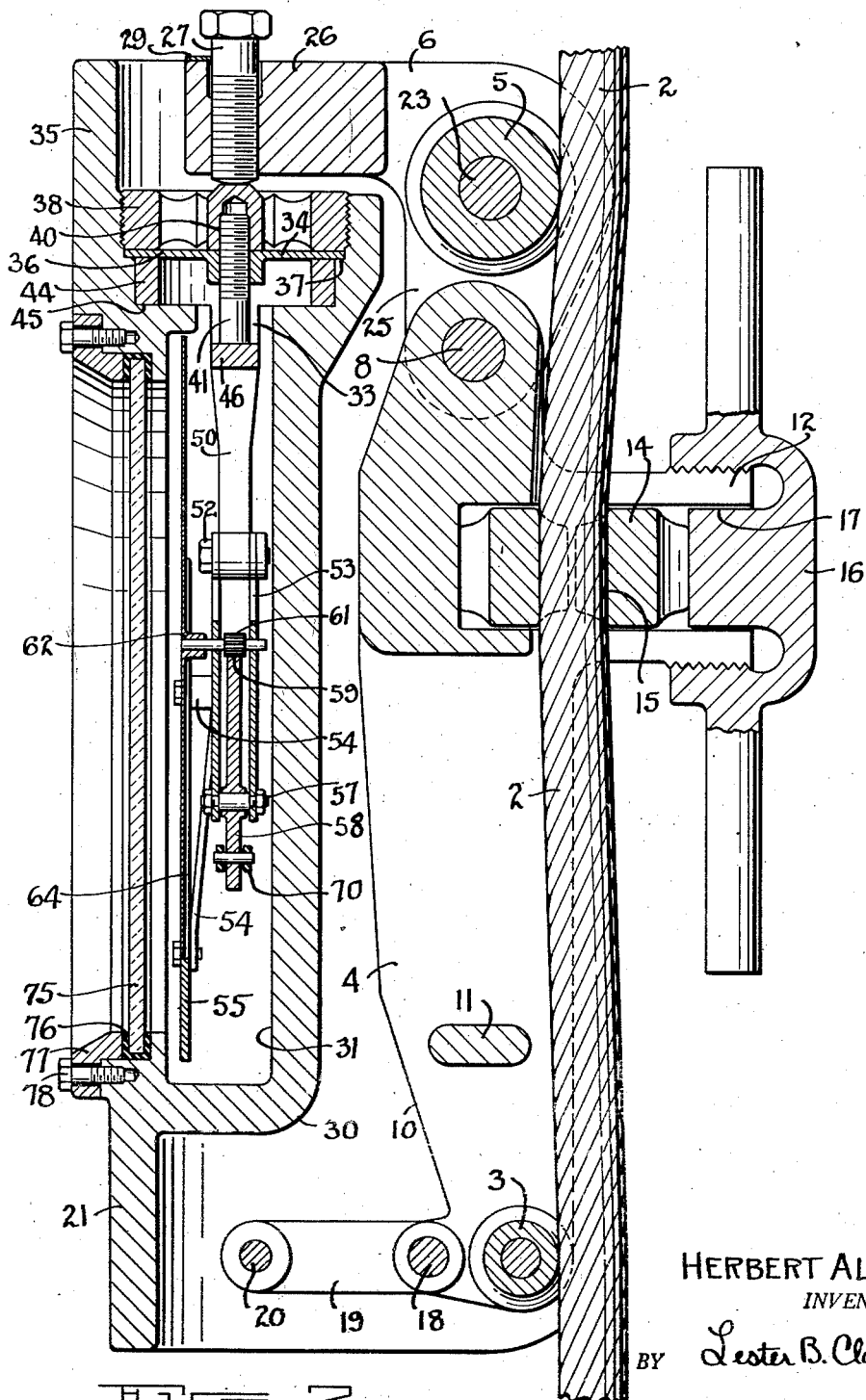
Fig. 2 is a section taken on the line 2—2 of Fig. 1 and illustrating the indicator mechanism, the elastic system and the load elements.

In Fig. 2 the cable or line carrying the load is indicated generally at 2 and it may or may not be the deadline on a hoisting or drilling rig. This cable is arranged to be held out of alignment by passing over a roller 3 on the lower end of a load arm 4 and over a roller 5 on a load lever 6. The arm 4 and the lever 6 have their adjacent ends pivoted together on the movable pivot pin 8 so that the mechanism works as a linkage. The load arm is best seen in Fig. 5 and includes the spaced side bars 10 which carry the roller 3 at their lower ends.

The spacer 11 provides a rigid structure. A hub 12 in this arm is arranged to receive the adjusting pin 14 which has an opening 15 therethrough to receive the line 2. A cap 16 is threaded on the hub 12 and the stud 17 of this cap abuts the adjusting pin and clamps it firmly in place in the load arm 4.

Figure 3:
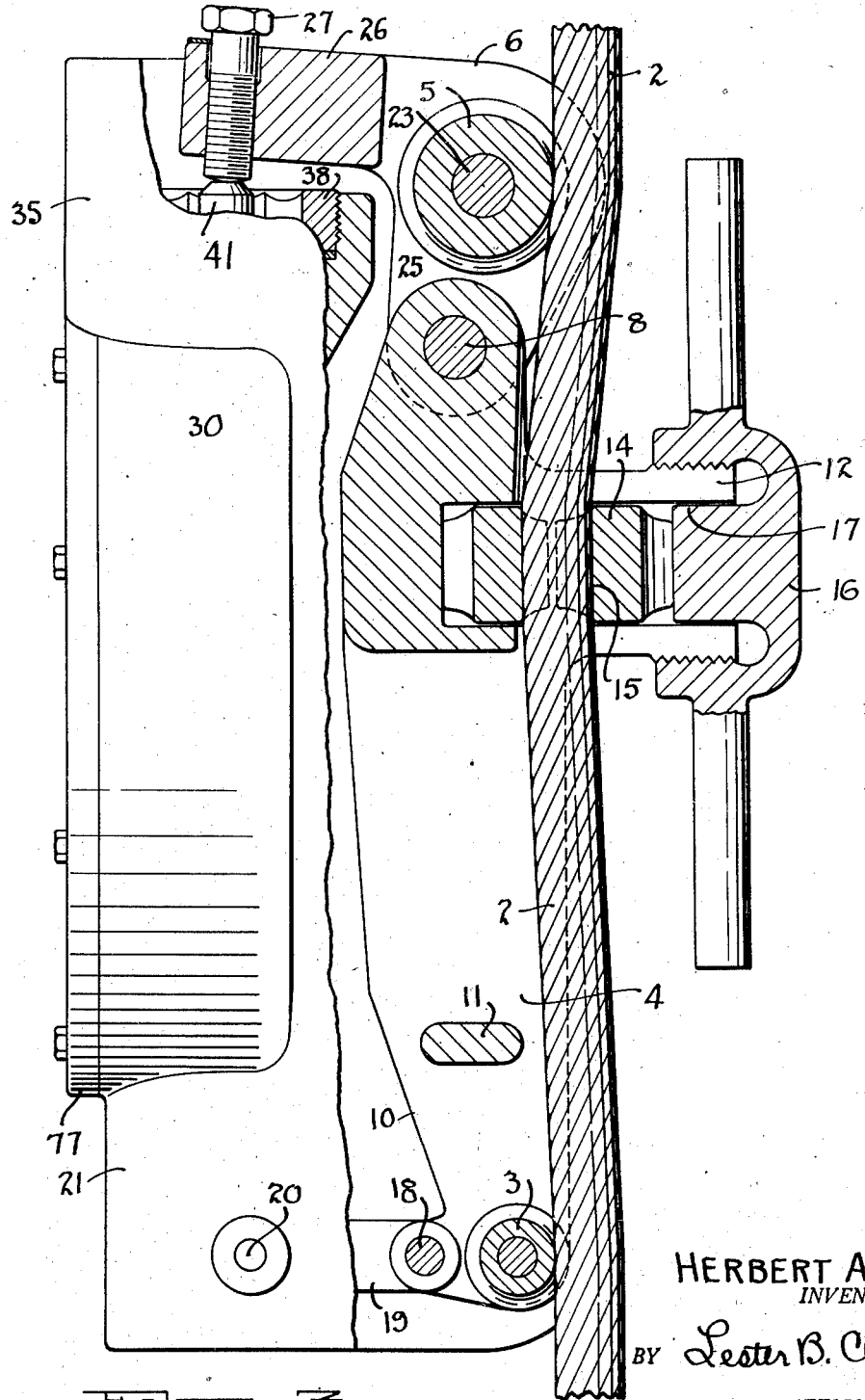
Fig. 3 is an edge elevation with certain of the parts in section.

Fig. 3 shows the cable as misaligned by this mechanism. The load arm 4 has its lower end connected to a pin or shaft 18 carried by the link 19 which is in turn pivoted at 20 to a body 21. The load lever 6 is also pivoted to the body 21 by the shaft 23 which supports the roller 5.

It seems obvious that as the load is applied to the line 2, there will be a tendency of the line to straighten out, as best seen in Fig. 2. This tendency of the line tends to bring the shaft 8 connecting the load and the lever arms into vertical alignment with the shafts 3 and 23, as seen in Fig. 2, while Fig. 3 shows the device in its normal position when there is no load on the line 2. The greater the load the greater will be the tendency of the line to straighten and the greater will be the pressure or load tending to rotate the load lever 6 counterclockwise about the shaft 23.

The load lever 6 is in the form of a bell crank in that it has the lower extending portion 25 which is connected to the load arm and the inwardly extending portion 26 which carries the adjusting bolt 27. This adjusting bolt is threaded into the portion 26 and, as seen in Fig. 6, may have suitable indicia 28 thereon so as to determine the position or adjustment of the bolt relative to a zero mark 29 on the face of the load lever. As seen in Fig. 6, the numerals 4 and 6 appear on the bolt indicating the adjustment for either four or six lines of the hoisting mechanism.

The body 21 serves as a support for the entire mechanism as it is carried by the line 2 and has an enlargement 30 thereon having a recess 31 therein. This recess is intended to enclose the indicator mechanism 32, the elastic system 33 and the load transmitting unit 34.

The load transmitting unit is arranged within the hollow neck portion 35 of the body 21 and has a disc or plate 36 disposed on a shoulder 37. This disc is in turn clamped in position by a lock ring 38. The plate 36 may be of a suitable flexible material so that it will be caused to move by the pressure applied from the load bolt 27 to the nut 40. The nut 40 is shown as threaded on to the upper end of a load pin 41 which passes through the plate or diaphragm 36.

An elastic system 33 is disposed within the housing 30 and, as seen in Fig. 2, has a base ring 44 which is disposed in the hollow neck 35 upon the shoulder 45 below the diaphragm 36. Thus when the lock ring 38 is screwed tightly into position the elastic system 33 and the plate 36 will be firmly clamped in the housing.

The elastic system 33 includes a beam or spring member 46 which is formed integrally with the base 44. This beam or spring has a flexible portion 47 thereon which is so disposed that the load pin 41 will abut against the central portion thereof at 48. This beam or spring 46 will follow the laws of the flexure of beams having fixed ends as is described in detail in my prior copending application. A beam having fixed ends, when loaded with a concentrated load at the center, follows a certain theory of flexure wherein the greatest angular deflection from normal unloaded position occurs at the quarter points.

In order to provide amplification in movement of the parts, the posts 50 and 42 are integrally formed with the beam 46 so that as the beam flexes the posts 50 and 42 will be moved apart. The length of the posts 50 and 42 increases the available movement caused by the load pin 41 flexing the beam.

Figure 1:
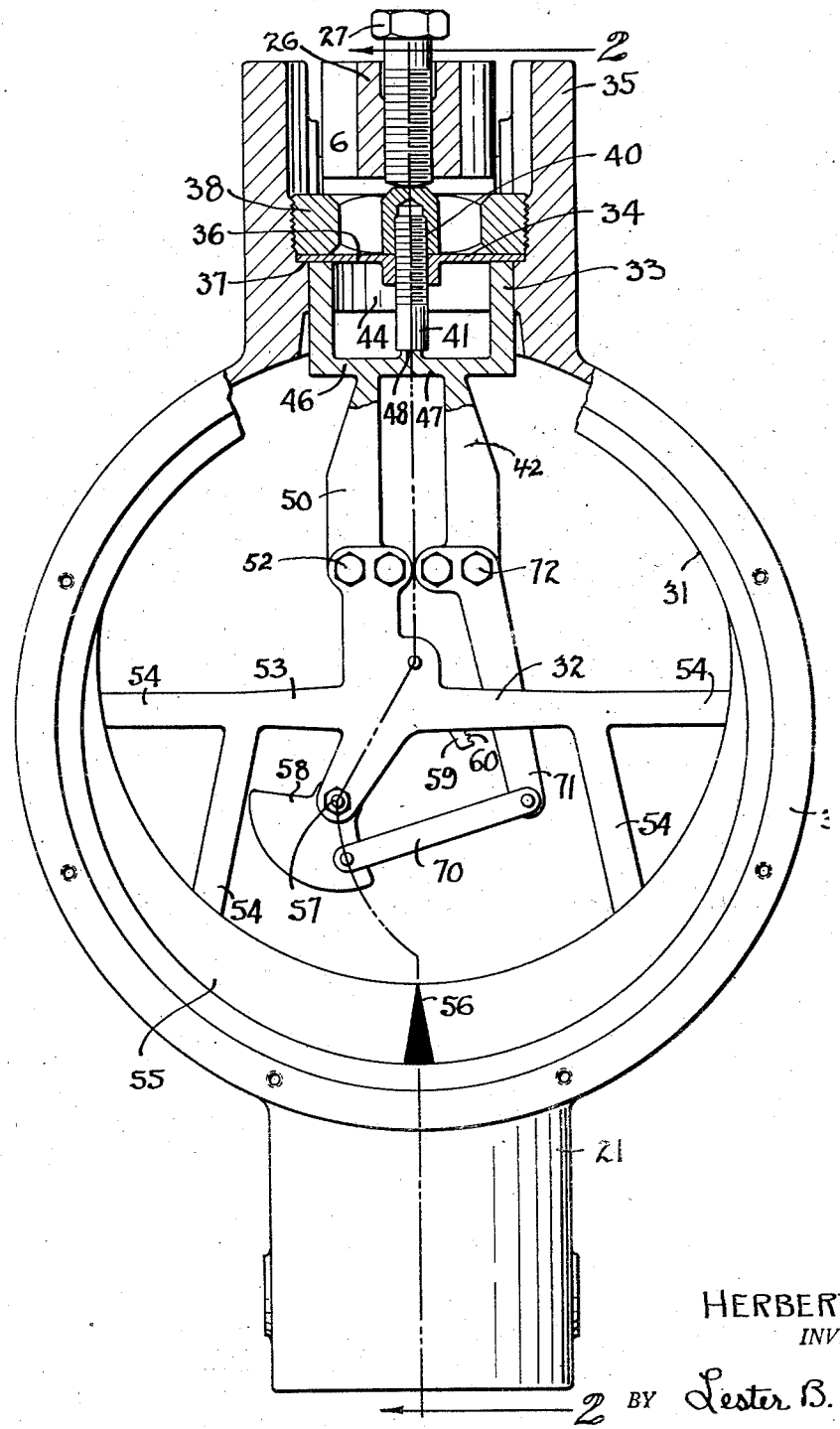
Fig. 1 is a front elevation of the device with the indicator dial removed and certain of the parts shown in section to illustrate the construction.

The indicator mechanism 32 will be actuated by this movement of the posts 50 and 42 and to this end a frame 53 is supported on the post 50 by the bolts 52. This frame is of peculiar construction, as seen in Fig. 1, in that it has the extensions 54 thereon which support the crescent 55 which carries the zero mark 56. The frame 53 also carries a shaft 57 which has the segment 58 pivoted thereon. This segment has a rack 59 having the teeth 60 which are arranged to mesh with a pinion 61 on the shaft 62, as best seen in Fig. 2.

It seems apparent that as the segment 58 pivots on the shaft 57 that the pinion 61 and the shaft 62 will be caused to rotate in the frame. An indicator disc 64 is mounted on the shaft 62 and arranged to turn therewith. This disc has the indicia 65 thereon as seen in Fig. 4.

In order to cause tilting of the segment 58 a link 70 is connected thereto which link is in turn pivoted on an extension arm 71 fixed at 72 on the post 42. With this mechanism as viewed in Fig. 1, the post 50 moves to the left and the post 42 moves to the right upon flexing of the beam 46. The post 50 carries the entire frame 53 with it, tending to move the shaft 57 to the left. The post 42, on the other hand, moves to the right and carries with it the extension arm 71 and the link 70 so that the segment 58 will be caused to pivot on its shaft. This combined movement serves to turn the indicator disc 64 relative to the zero mark 56 and by adjustment of the various parts an accurate indication of the load on the line 2 can be obtained.

The recess 31 of the body will be closed by a suitable transparent plate 75 which may be sealed in position with a gasket 76 which is in turn held in place by a cover ring 77 affixed with the bolts 78. If desired, a suitable liquid may be used to fill the recess to avoid excessive vibration of the parts and prevent corrosion.

Broadly, the invention contemplates a weight indicator having an elastic system which will be actuated as a function of the load caused by the weight to be indicated.

What is claimed is:

1. A weight indicator including a body, means movably carried thereon to receive and offset a weight carrying line, an elastic system carried by said body to yield upon the application of pressure to said elastic system, and means movable by said first named means as a function of the weight on said line to apply pressure to actuate said elastic system, said elastic system including an elastic beam, arms thereon and extending laterally therefrom at spaced points intermediate the ends of the beam to move with respect to each other upon flexure of said beam or spring, and an indicator device operable by said arms.

2. A weight indicator including a body, means movably carried thereon to receive and offset a weight carrying line, an elastic system carried by said body to yield upon the application of pressure thereto, and means movable by said first means as a function of the weight on said line, said elastic system including a beam member, means to fix the ends of said beam, means to apply the pressure from said second named means to the center of said beam, and members connected to the beam at the points of greatest flexure and operable to indicate the flexure as a measure of the applied pressure.

3. In a weight indicator a body, an indicator mechanism carried by said body and including a leverage device, arms connected to actuate said device upon relative movement of the arms due to an applied pressure being gauged, an elastic system connected to said arms and flexible under pressure to move said arms with respect to each other, and means to transmit a pressure to said system which is a function of the load whose weight is to be indicated, said system including a beam having fixed ends and having said arms connected thereto at the points of greatest flexure.

4. In a weight indicator a body, an indicator mechanism carried by said body and including a leverage device, arms connected to actuate said device upon relative movement of the arms due to an applied pressure being gauged, an elastic system connected to said arms and flexible under pressure to move said arms with respect to each other, and means to transmit a pressure to said system which is a function of the load whose weight is to be indicated, said last means including a load arm pivotally connected to said body at one point and having a second part to engage and misalign a loaded cable said second part including an adjustable element on said load arm to vary the misalignment.

5. In a cable tensiometer, a body, a load arm pivotally connected at one end to said body, a lever pivotally connected to the other end of said arm and fulcrumed upon said body, means on said arm and body to misalign a cable element by contact between said arm and cable element at points adjacent the first mentioned pivotal connection and intermediate the ends of said arm and between said body and cable element substantially at the fulcrum of said lever so that the variation in the load on said element tends to pivot said arm and lever, and an indicator device carried by said body and connected to and operable by the pivotal movement of said lever to indicate tension on said cable.

6. In a weight indicator a body, an indicator device therein, an elastic system connected to actuate said indicator and to be stressed by the load of the weight to be indicated, a load lever pivotally connected to said body, an adjustable means on said lever to engage and actuate said system as a function of the movement of the lever, and a load arm pivotally connected to said body and to said lever at a point spaced from the pivotal connection of the lever to the body, and additional means on said arm between its pivotal connections to engage and deflect a flexible element, whereby load applied to such flexible element will move said arm as a function of the applied load so as to actuate said lever, adjustable means, system, and indicator.

7. A weight indicator including a body, a flexure element supported in said body, an indicator mechanism operable due to flexing of said element, a load pin to apply a pressure to said element, means to support said pin in said body, a linkage assembly pivoted on said body to engage said pin and to be moved by the tension of a flexible cable carrying the weight to be indicated, said linkage including a pair of levers each pivotally connected to said body, and in turn pivotally connected to each other one of said levers having an arm engaging said pin to move the same upon rotation of said levers, a portion on each lever to be engaged by the flexible element, and additional means carried by the other of the levers and disposed between the engaged portions to engage and misalign the flexible element so that tension on said element tends to correct such misalignment and thereby move said levers and apply a pressure to said pin which is a function of the load on the flexible element.

8. A cable tensiometer comprising a body, a lever fulcrumed on said body and having a part spaced from its fulcrum and adapted to engage and deflect a portion of a cable, and a part more distantly spaced from its fulcrum adapted to engage a second lever, a second lever fulcrumed on said body and having a part adapted to be engaged by and moved by said first lever as it swings about its fulcrum, and a second part more distant from the fulcrum of the second lever adapted to engage and flex an elastic system, means for indicating the amount of flexure of said elastic system, and negative mechanical advantage means connecting said indicating means with said elastic system for multiplying movements of said elastic system as registered by said indicating means.

9. A cable tensiometer comprising a body, a lever fulcrumed on said body and having a part spaced from its fulcrum and adapted to engage and deflect a portion of a cable, and a part more distantly spaced from its fulcrum adapted to engage a second lever, a second lever fulcrumed on said body and having a part adapted to be engaged by and moved by said first lever as it swings about its fulcrum, and a second part more distant from the fulcrum of the second lever adapted to engage and flex an elastic system, means for indicating the amount of flexure of said elastic system, and means for connecting said indicating means to said elastic system for movement thereby.

HERBERT ALLEN.